United States Patent Office.

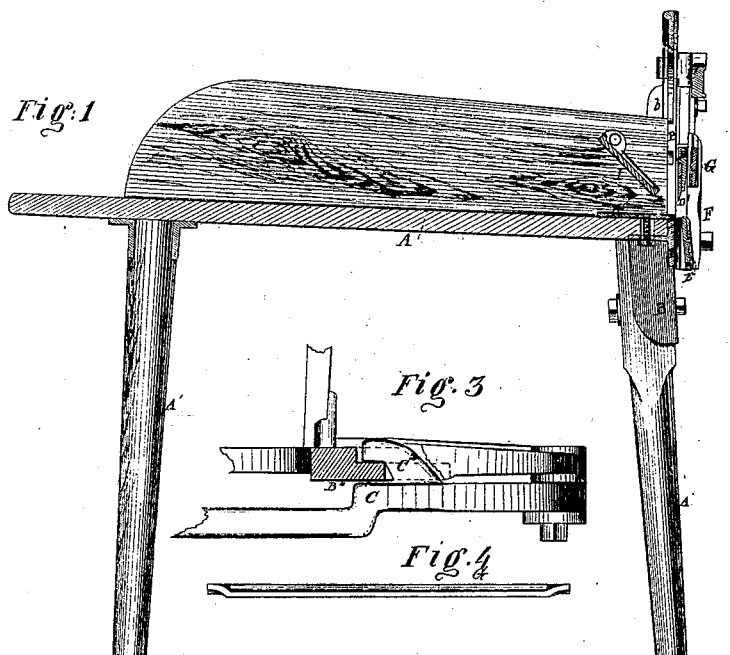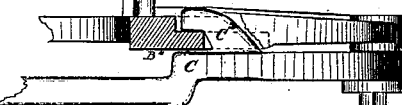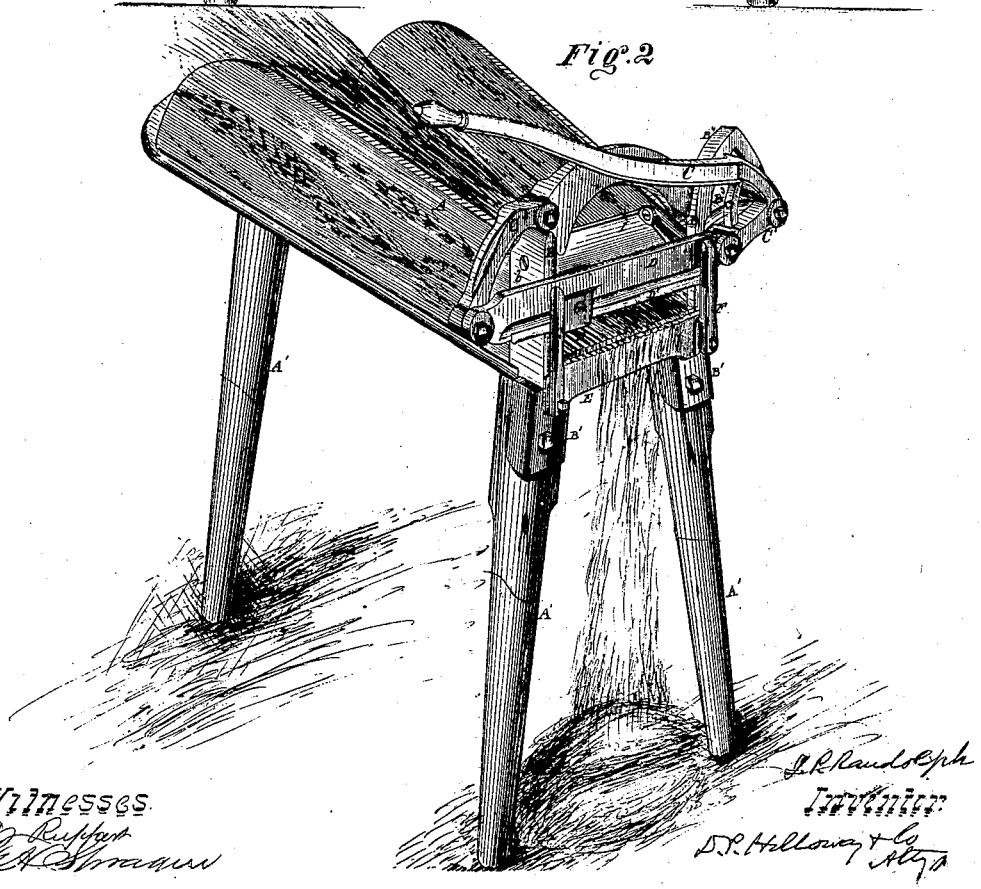

J. P. RANDOLPH, OF MARIETTA, OHIO.

Letters Patent No. 98,414, dated December 28, 1869.

IMPROVEMENT IN FEED-CUTTER.

The Schedule referred to in these Letters Patent and making part of the same.

*To all whom it may concern:*

Be it known that I, J. P. RANDOLPH, of Marietta, in the county of Washington, and State of Ohio, have invented certain Improvements in Feed-Cutters; and I do hereby declare that the following is a full, clear, and exact description thereof, reference being had to the annexed drawings, making part of this specification, in which—

Figure 1 is a longitudinal vertical section.

Figure 2 is a perspective view.

Figure 3 is a sectional top view of a portion of the frame upon the front end of the cutter-box, showing part of the lever, the lug or hook thereon, and its guide on the frame.

Figure 4 is a top view of the plate for determining the length the feed is to be cut.

The same letters are used in all the figures, in the designation of identical parts.

My invention relates to a machine for cutting hay, straw, or other feed; and

My improvements consist in the construction, combination, and arrangement of certain parts pertaining to such a machine, as hereinafter more fully described.

To enable those skilled in the art to make and use my invention, I will proceed to describe its construction and operation.

A, in the drawings, represents the box or trough, mounted upon legs $A^1$, so as to raise it to a convenient height. The rear end is to be left open, and to its front end is to be attached the machinery for cutting the feed, which is fed forward by the operator.

B represents a frame, of cast-iron or other suitable metal, secured to the front end of the box by means of flanges $b$ $b$ $b$, extending under the bottom and along its sides, as shown. Sockets $B^1$ $B^1$ are formed on it for the reception of the front legs, which are secured therein by bolts or in any other convenient manner. To strengthen the frame as well as to give to it a more ornamental appearance, its upper ends are united by an arched cross-bar, cast in one piece with it, or it may be cast separately and bolted to it. This arched bar is suitably formed at a point, $B^2$, to receive and have pivoted to it the upper end of a link, $C^3$. Upon the opposite side, a bar or arm, $B^3$, extends outward from the frame, bossed on its outer end, and there perforated to receive the bolt upon which the lever C is fulcrumed. Another arched bar or guide, $B^4$, rises upward from this side of the frame, forming the segment of a circle, having the lever fulcrum as its centre. The sectional form of this guide is clearly shown in fig. 3, the reduced portion of which is to be held between the lever C and its hooks, and thus serves as a guide for the same. The outer ends of the arm $B^3$ and guide $B^4$ may be connected by an arched cross-bar, as shown, so as to strengthen them, and which also serves as a stop to the upward movement of the lever.

C represents a lever, which may have the form clearly shown in fig. 2. From the end where it is pivoted to the bar $B^3$ of the frame, extends from it at an angle, and cast or formed in one piece with it, a short arm, $C^1$, which is bifurcated at its outer end to receive one end of the knife-frame to be pivoted to it, said arm and lever being again united together by a cross-bar, $c$. A lug or hook, $C^2$, is formed upon the inner side of the lever, which is to embrace the reduced portion of the guide $B^4$ along which it works. Just beyond the point where the hook is formed on it, the lever is bent outward, so as to enable it, when pressed down, to clear the parts attached to the front of the frame.

$C^3$ represents a link, the upper end of which is hinged to the frame B at a point, $B^2$, and has pivoted to its lower end the other end of the knife-frame, which is thus suspended directly in front of the box between this link and the arm $C^1$ of the lever. By thus arranging the knife, a drawing-stroke will be imparted to it by operating the lever.

D represents the knife-frame, which is to be recessed on its inner side to receive the knife $D^1$, which, when inserted in such recess, is to be flush with the surface of the former.

E is a plate of metal, extending across the front end of the box, and so arranged on the frame B as to leave a small space between the same and such plate, such space gradually widening from top to bottom, consequent upon the formation of the plate, it being provided with oblique flanges upon its ends, by which it is inserted and held between the standards F and the face of the frame B. Its upper serrated edge is to be about flush with the upper surface of the box bottom plate H, thus forming a support on the outer side of the knife for the hay to be cut. The knife, in cutting, enters the space between this plate and the face of the iron frame.

F F represent two standards, the lower portions of which are placed against the flanges of the plate E, when all are secured to the frame by screw-bolts. Thin washers, of leather or other material, are to be inserted between the standards and the plate, so that the former may be brought closer to the frame B, in conjunction with which they serve as guides for the knife-frame, when required.

The edges of the standards facing each other are to be provided with grooves in their upper portions to receive the oblique flanges of another plate, G, the office of which is to determine the length the feed is to be cut, such feed being pushed out of the end of the box, after each cut, until it abuts against this plate, (the construction of this plate is shown in fig. 4,) as a consequence of which the distance between it and the mouth of the box may be lengthened or shortened by turning up one edge or the other of the same.

H represents a serrated plate of metal, which forms the lower front edge of the box, and extends back some distance upon the bottom thereof, to which it is secured by bolts which pass through elongated holes in such bottom, and in the flange $b$ of the iron frame B, so that the front edge of such plate can be set accurately and in close proximity to the knife, at all times.

I is the compressing-board, pivoted in the box to its sides, as shown. It serves to somewhat compress the feed before it is pushed out to be cut by the knife. Lugs on the frame B prevent it from swinging back further than is desirable.

Having thus described my invention,

What I claim, and desire to secure by Letters Patent, is—

1. The combination of the lever C, having a hook, $C^2$, formed upon one side, with the guide $B^4$ of the frame B, substantially as and for the purpose set forth.

2. In combination with the above elements, the knife-frame D, knife $D^1$, and link $C^3$, substantially as and for the purpose set forth.

3. The plate E, constructed with oblique flanges, and arranged substantially as and for the purpose set forth.

4. The plate G, constructed with oblique flanges, and arranged to operate substantially as and for the purpose set forth.

In testimony whereof, I have signed my name to this specification, in the presence of two subscribing witnesses.

J. P. RANDOLPH.

Witnesses:
STEPHEN NEWTON,
M. H. BOOTH.